US010856120B2

(12) United States Patent
Willis et al.

(10) Patent No.: US 10,856,120 B2
(45) Date of Patent: Dec. 1, 2020

(54) PROVIDING INTER-VEHICLE DATA COMMUNICATIONS FOR MULTIMEDIA CONTENT

(71) Applicant: BlackBerry Limited, Waterloo (CA)

(72) Inventors: Edward Snow Willis, Ottawa (CA); Kristian Neil Spriggs, Ottawa (CA); Sameh Ayoub, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/012,276

(22) Filed: Jun. 19, 2018

(65) Prior Publication Data
US 2019/0387378 A1 Dec. 19, 2019

(51) Int. Cl.
| | |
|---|---|
| *H04W 4/46* | (2018.01) |
| *H04W 4/70* | (2018.01) |
| *G08G 1/0967* | (2006.01) |
| *H04L 29/08* | (2006.01) |
| *H04W 4/02* | (2018.01) |
| *H04W 4/14* | (2009.01) |
| *H04W 4/80* | (2018.01) |

(52) U.S. Cl.
CPC ........ *H04W 4/46* (2018.02); *G08G 1/096791* (2013.01); *H04L 67/12* (2013.01); *H04W 4/025* (2013.01); *H04W 4/14* (2013.01); *H04W 4/70* (2018.02); *H04W 4/80* (2018.02)

(58) Field of Classification Search
CPC ......... H04W 4/46; H04W 4/04; H04W 4/046; H04W 4/70; H04W 4/80; H04L 67/12
See application file for complete search history.

(56) References Cited

U.S. PATENT DOCUMENTS

| | | | |
|---|---|---|---|
| 9,140,782 B2 | 9/2015 | Alberth et al. | |
| 2011/0013020 A1 | 1/2011 | Jo | |
| 2017/0017734 A1 | 1/2017 | Groh et al. | |
| 2017/0104824 A1 | 4/2017 | Singh et al. | |
| 2019/0012908 A1* | 1/2019 | Chun | G01S 19/42 |

FOREIGN PATENT DOCUMENTS

KR 20170081920 1/2019

OTHER PUBLICATIONS houstontranstar.org [online], "Houston TranStar Cameras," available on or before May 11, 2018, retrieved from URL <http://traffic.houstontranstar.org/cctv/transtar>, 2 pages.

(Continued)

*Primary Examiner* — Jae Y Lee
*Assistant Examiner* — Aixa A Guadalupe Cruz
(74) *Attorney, Agent, or Firm* — Fish & Richardson P.C.

(57) ABSTRACT

Systems, methods, and software can be used to provide inter-vehicle data communications for multimedia content. In some aspects, a method is disclosed comprising: receiving, at a first vehicle, a multimedia content request message from a second vehicle, wherein the multimedia content request message indicates a target location at which multimedia content is requested; determining, a current location of the first vehicle; in response to determining that the current location matching the target location, generating the multimedia content; and transmitting, by the first vehicle, the multimedia content.

17 Claims, 3 Drawing Sheets

(56) References Cited

OTHER PUBLICATIONS mto.gov.on.ca' [online], "Ministry of Transportation, Traffic Cameras, Traffic Camera Information," Ontario, Traveller's Road Information Portal—Traffic Cameras, available on or before May 11, 2018, retrieved from URL: <http://www.mto.gov.on.ca/english/traveller/trip/traffic_cameras_list.shtml>, 4 pages.
Extended European Search Report issued in European Application No. 19167176.7 dated Oct. 15, 2019, 10 pages.
Islam, "A peer-to-peer network architecture for emerging applications." Proceedings of the 2014 IEEE 15th International Conference on Information Reuse and Integration (IEEE IRI 2014). IEEE, Aug. 13, 2014, 4 pages.
Extended European Search Report issued in United States Application No. 19167176.7 dated Oct. 23, 2019, 10 pages.

\* cited by examiner

PROVIDING INTER-VEHICLE DATA COMMUNICATIONS FOR MULTIMEDIA CONTENT

TECHNICAL FIELD

The present disclosure relates to providing inter-vehicle data communications for multimedia content.

BACKGROUND

In some cases, a vehicle can include one or more sensors. The one or more sensors can generate inputs, e.g., video or audio inputs, that reflect the surroundings of the vehicle. Examples of the sensors can include cameras, microphones, laser, radar, ultrasonic, light detection and ranging (LIDAR) or any other sensors.

The vehicle may also include an autopilot processing platform that generate autopilot commands. The autopilot processing platform can receive inputs from one or more sensors installed on the vehicle. The autopilot processing platform may include one or more autopilot processors that generate autopilot commands based on these inputs. These autopilot commands are directed to components of the vehicle to control the movements of the vehicle. Examples of the components include without limitation steering wheel, brakes, accelerator, lights, and the like. Examples of the autopilot commands include without limitation accelerate, decelerate, turn left or right, signal, and the like. A vehicle equipped with the autopilot processing platform can be referred to as a self-driving vehicle, a driver-less vehicle, an autonomous or semi-autonomous vehicle, or an autopilot vehicle.

DETAILED DESCRIPTION

In some cases, vehicles can transmit data between one another. For example, one vehicle can transmit information about the traffic around the vehicle to another vehicle. This information can include enviromental information such as streetlights, buildings, obstacles, cyclists, or pedestrians that are captured by the sensor of the vehicle. This information can also include information related to the driving actions of the vehicle, e.g., information of speed, acceleration, turning. These data can be used for the recieving vehicle to perform autopilot processing and generate autopilot or semi-autopilot commands for the receiving vehicle.

Inter-vehicle data communications can be performed using vehicle-to-vehicle (V2V) communication protocols. V2V refers to communication between any two Intelligent Transportation Service (ITS) capable vehicles. V2V enables transport entities, such as vehicles, to obtain and share information regarding their local environment in order to process and share knowledge for more intelligent transport related services or applications, for example, cooperative route planning, cooperative collision warning, or autonomous driving. In some cases, V2V can refer to services provided to a user equipment for communication supporting vehicle oriented services. Examples of vehicle oriented services include road safety, (transport) traffic efficiency, and other application services. One will appreciate that the terminology in this disclosure is directed at communications between vehicles, intelligent transport service capable devices, roadside units, and pedestrians, etc. However, the technology is also applicable to other types of transportation systems, their infrastructure and passengers, e.g., trains, track side signaling, passengers, aerial vehicles, drones, etc., and vehicles that can communicate with trackside signaling, e.g., cars at level crossings etc. In some cases, the inter-vehicle data communications can also be carried out using vehicle-to-infrastructure (V2I) communication protocols. For example, alternative to or in combination with transmitting a V2V message from a first vehicle to a second vehicle, the first vehicle can transmit a V2I message to a server, and the server can forward the V2I message to the second vehicle.

In some cases, multimedia content, including graphic images such as a picture or video of the road, can be useful to the autopilot processing platform, the driver who operates the vehicle, or both in making routing decisions. For example, the images of a congestion point can provide a good indication of the degree of congestion at these places. In some cases, cameras have been installed at fixed locations, such as highway exits or some busy intersections, and a vehicle or a driver can query relevant websites to receive images from these cameras. However, there are a limited number of these cameras and they are installed at a limited number of locations, and therefore may not be sufficient to provide ubiquitous coverage. If an accident takes place at some mid point of a road, it is unlikely that there have been cameras that are pre-installed or available to other vehicles to provide graphic images at this location.

Figure 1:
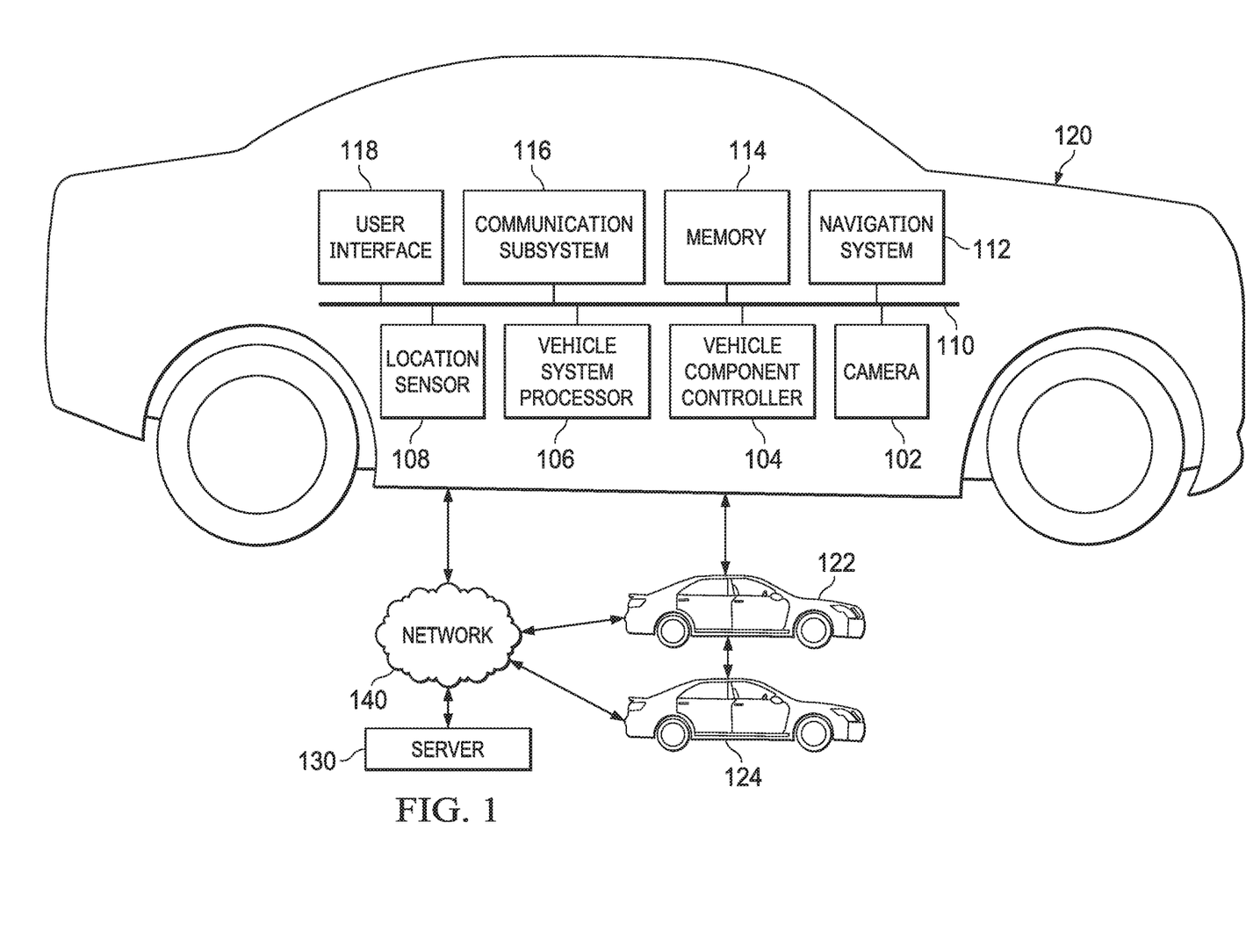
FIG. 1 is a schematic diagram showing an example communication system that provides inter-vehicle data communications for multimedia content, according to an implementation.
Figure 2:
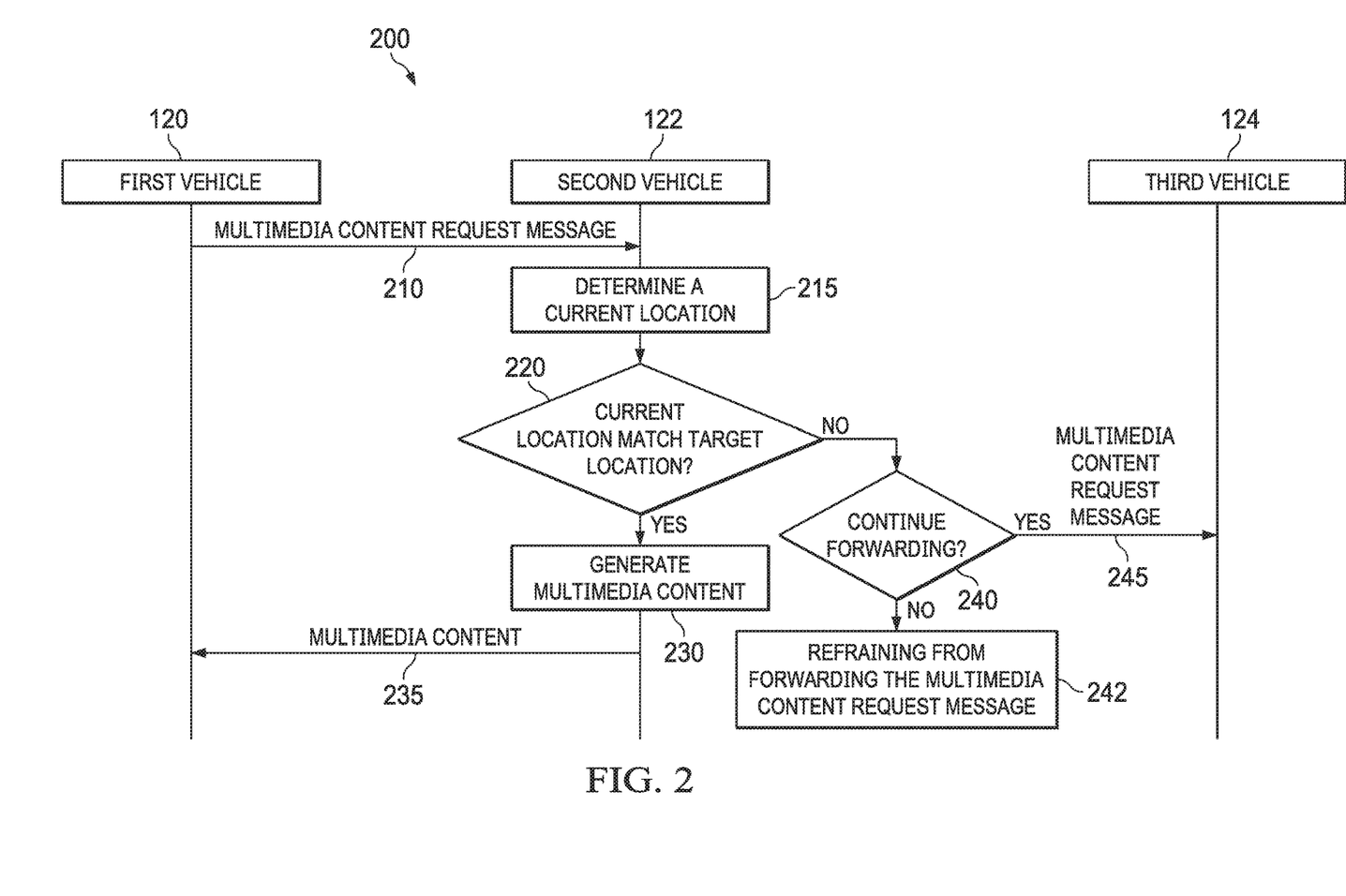
FIG. 2 is a flow diagram showing an example process that provides inter-vehicle data communications for multimedia content, according to an implementation.
Figure 3:
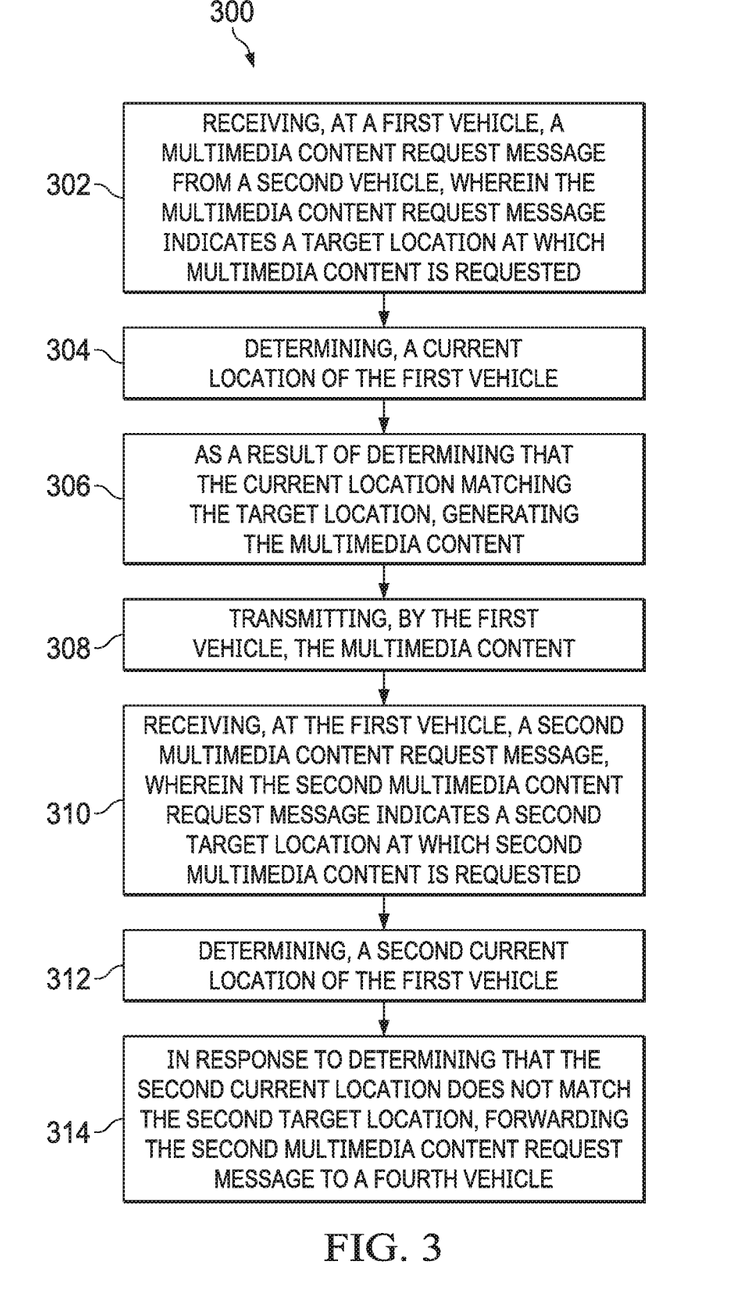
FIG. 3 is a flow diagram showing an example method that provides inter-vehicle data communications for multimedia content, according to an implementation Like reference numbers and designations in the various drawings indicate like elements.

Due to the development of autopilot technologies, more and more vehicles are equipped with cameras that can take graphic images on the road. Therefore, vehicles at these locations, can be requested to provide graphic images of these locations. This approach can provide graphic information at dynamic locations on demand. V2V communication protocols can be used to facilitate the transmission of this graphic information between vehicles. V2V messages have limited size, and therefore may not be able to carry image data that has a large payload. Therefore, V2V message can be used to convey multimedia content requests, while a different communication technology, e.g., Multimedia Messaging Service (MMS), can be used to transport the requested multimedia content. Furthermore, V2V communication protocols use short-range communication technologies to transmit information between vehicles that are close to each other, while the distance between the location of the vehicle that requests the multimedia content and the congestion location may be beyond the coverage range of a V2V message. In these cases, the multimedia content request can include location information that enables vehicles to relay the multimedia content request to different vehicles. FIGS. 1-3 and associated descriptions provide additional details to these implementations.

FIG. 1 is a schematic diagram showing an example communication system 100 that provides inter-vehicle data communications for multimedia content, according to an implementation. At a high level, the example communication system 100 includes a first vehicle 120, a second vehicle 122, a third vehicle 124 that are communicatively coupled with each other. The example communication system 100 also includes a server 130 that are communicatively coupled with the first vehicle 120, the second vehicle 122, and the third vehicle 124.

A vehicle, e.g., the first vehicle 120, the second vehicle 122, and the third vehicle 124, can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In the illustrated example, the first vehicle 120 includes a camera 102, a vehicle component controller 104, a vehicular system processor 106, a communication subsystem 116, a user interface 118, memory 114, a navigation system 112, a location sensor 108 that are connected to a bus 110. The second vehicle 122 and the third vehicle 124, though not illustrated, can include similar components as the first vehicle 120.

The first vehicle 120 includes a camera 102. Although illustrated as a single camera 102 in FIG. 1, the first vehicle 120 can include two or more cameras 102. The camera 102 can include a lens, image processors, or other components that generate still images such as photos, or videos.

The first vehicle 120 includes a location sensor 108. The location sensor 108 represents an application, a set of applications, software, software modules, hardware, or any combination thereof that can be configured to determine a current location of the first vehicle 120. In one example, the location sensor 108 can be a Global Positioning System (GPS) receiver.

Although not illustrated, the first vehicle 120 can include other sensors that detect or measure information for the first vehicle 120. For example, these sensors can include devices that capture environmental information that is external to the first vehicle 120, such as microphones, radars, laser transmitters and receivers, and the like. These sensors can provide environmental inputs for an autopilot processing platform operating on the first vehicle 120 to make autopilot decisions. These sensors can also include devices that capture information that is internal to the first vehicle 120, such as monitors for components such as engine, battery, fuel, electronic system, cooling systems and the like. These sensors can provide operation status and warnings to the autopilot processing platform operating on the first vehicle 120.

The first vehicle 120 includes a vehicle component controller 104. Although illustrated as a vehicle component controller 104 in FIG. 1, the first vehicle 120 can include two or more vehicle component controllers 104. The vehicle component controller 104 represents a controller that controls the operation of a component on the first vehicle 120. Examples of the components can include engine, accelerator, brake, radiator, battery, steering wheel, transmission system, cooling system, electrical system, and any other components of the first vehicle 120. The vehicle component controller 104 can operate a respective component automatically, according to input from the vehicular system processor 106, or a combination thereof. In some implementations, the vehicle component controller 104 can include a data processing apparatus.

The navigation system 112 represents an application, a set of applications, software, software modules, hardware, or any combination thereof that can be configured to provide navigation information to the first vehicle 120. For example, the navigation system 112 can include a map application that generates a map, processes current traffic information, and calculates a route for the first vehicle 120.

The vehicular system processor 106 can include one or more processing components (alternatively referred to as "processors" or "central processing units" (CPUs)) configured to execute instructions related to one or more of the processes, steps, or actions for the autopilot processing platform operating on the first vehicle 120. Generally, the vehicular system processor 106 executes instructions and manipulates data to perform the operations of the driving processing platform. The vehicular system processor 106 can receive inputs from the sensors (including the camera 102 and the location sensor 108) and generate commands to the vehicle component controller 104. In some cases, the vehicular system processor 106 can perform autopilot operations. The vehicular system processor 106 can perform operations including generating multimedia content request message, directing the camera 102 to generate multimedia content, and directing the communication subsystem 116 to transmit and receive multimedia content request message. FIGS. 2-3 and associated descriptions provide additional details to these implementations. In some cases, the vehicular system processor 106 can include a data processing apparatus.

The communication subsystem 116 can be configured to provide wireless or wireline communication for data or control information provided by the vehicular system processor 106. For example, the communication subsystem 116 can support transmissions over wireless local area network (WLAN or WiFi), near field communication (NFC), infrared (IR), Radio-frequency identification (RFID), Bluetooth (BT), Universal Serial Bus (USB), or any other short-range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver. The communication subsystem 116 can support inter-vehicle communication protocols, for example V2V communication protocols, to communicate with other vehicles, e.g., the second vehicle 122.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the first vehicle 120 and various other computer-executable software programs for performing one or more of the processes, steps, or actions described above.

As illustrated, the bus 110 provides a communication interface for components of the autopilot processing platform operating on the first vehicle 120. In some cases, the bus 110 can be implemented using a Controller Area Network (CAN) bus.

Some of the components of the first vehicle 120 can be implemented on a device that is associated with the first vehicle 120. For example, the navigation system 112 can be implemented on a portable electronic device that is connected with the first vehicle 120 over NFC, BT, USB or any other wireless or wireline communication technologies. The portable electronic device may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network.

The server 130 represents an application, a set of applications, software, software modules, hardware, or any combination thereof that can be configured to transmit multimedia content between the first vehicles 120, the second vehicle 122, and the third vehicle 124. For example, the server 130 can be an MMS server that receives and transmits multimedia content according to MMS protocols. The server 130 can also be a server that provides social media, email of other communication services. In some cases, the server 130 can be implemented in a cloud computing platform.

The example communication system 100 includes the network 140. The network 140 represents an application, set of applications, software, software modules, hardware, or combination thereof, that can be configured to transmit data between the server 130 and the vehicles in the system 100. The network 140 includes a wireless network, a wireline network, or a combination thereof. For example, the network 140 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example process 200 that provides inter-vehicle data communications for multimedia content, according to an implementation. The process 200 can be implemented by the first vehicle 120, the second vehicle 122, and the third vehicle 124 as shown in FIG. 1. The process 200 shown in FIG. 2 can also be implemented using additional, fewer, or different entities. Furthermore, the process 200 shown in FIG. 2 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 200 begins at 210, wherein the first vehicle 120 transmits a multimedia content request message to the second vehicle 122. The multimedia content request message includes a target location field. The target location field indicates the target location where the multimedia content is requested. For example, the target location field can include longitude and latitude data of the target location, road names of intersection of the target location, highway exit number of the target location, or any combinations thereof.

In some implementations, the target location can be generated based on the current traffic on the road. For example, the first vehicle 120 can receive traffic status information from a navigation system. The traffic status information can include current average driving speed of different segments on the road. The first vehicle 120 can compare the current average driving speed with historical average driving speed. The first vehicle 120 can determine whether a road segment is congested and the degree of the congestion based on the comparison. The congested locations can be determined based on the congested road segments. For example, the congested location can be the starting point on a road segment where the current average driving speed is slower than the historical average driving speed by at least a threshold. The first vehicle 120 can select one or more locations from these congested locations. In one example, the first vehicle 120 can select the first congested location on its route. Alternatively or in combination, the first vehicle 120 can select the congested locations that are more severe, i.e., where the differences between the current average driving speed and the historical average driving speed are the largest. In some cases, the traffic status information can include location information of the congested locations, the degree of the congested locations, and a combination thereof.

Alternatively or in combination, the target location can be determined based on user inputs. For example, the first vehicle 120 can output the current traffic condition on a user interface, and the user can select a target location by a touch, tap, text input, voice input, or any other user interface input techniques. The user can select the target location according to current traffic, tourist attractions, or any other points of interest.

In some implementations, the multimedia content request message also includes a current location field that indicates the current location of the first vehicle 120. The first vehicle 120 can use a location determination sensor, e.g., a GPS receiver, to determine the current location, and include location data of the current location, e.g., longitude and latitude data, in the current location field.

In some implementations, the multimedia content request message can also include a contact information field. The contact information field can include contact information associated with the first vehicle 120. Examples of the contact information can include a phone number, an email address, a social media handle, or other addressing information for the first vehicle 120 or a communication device associated with the first vehicle 120.

In some implementations, the multimedia content request message can comprise a V2V message, e.g., a broadcast, a multi-hop, or a packet forwarding V2V message. The target location field, the current location field, the contact information field, or any combinations thereof that can be included in an extension field of the V2V message. The multimedia content request message can be transmitted between the first vehicle 120 and the second vehicle 122 using a V2V communication protocol.

At 215, the second vehicle 122 determines the current location of the second vehicle 122. In some implementations, the current location of the second vehicle 122 can be determined using a location determination sensor.

At 220, the second vehicle 122 determines whether the current location of the second vehicle 122 matches the target location indicated by the multimedia content request message. In some implementations, the second vehicle 122 can compare the current location and the target location, and determine the distance between these two locations. If the distance is below a threshold, the second vehicle 122 can determine that its current location matches the target location. The threshold can be configured at the second vehicle 122, e.g., by an owner of the second vehicle 122, the manufacturer of the second vehicle 122, a server, or any combinations thereof. Alternatively or in combination, the threshold can be included in the multimedia content request message.

If the current location matches the target location, the process 200 proceeds from 220 to 230, where the second vehicle 122 generates a multimedia content. The multimedia content can include a video, a photo, audio, text, or any other types of graphic image data. In some implementations, the type, the size (e.g., the number of images or the length of the video) of multimedia content can be indicated by the multimedia content request message. In some implementations, the second vehicle 122 can use one or more sensors, e.g., cameras mounted at different parts of the second vehicle, to generate the multimedia content.

From 230, the process 200 proceeds to 235, where the second vehicle 122 transmits the multimedia content to the first vehicle 120. In some implementations, the multimedia content can be transmitted using a communication protocol that can handle a large size of content. For example, the multimedia content can be transmitted using MMS. The second vehicle can use the phone number of the first vehicle 120 that is included in the multimedia content request message to transmit the multimedia content using MMS. The second vehicle 122 can also use other communication protocols, e.g., email or social media app to transmit the multimedia content, using the corresponding contact information of the first vehicle 120 in the multimedia content request message. Upon receiving the multimedia content, the first vehicle 120 can process the multimedia content to determine the degree of traffic congestion, and determine whether to change its route. Alternatively or in combination, the first vehicle 120 can output the multimedia content on a user interface, and the user can determine whether to change the route accordingly.

In some cases, the second vehicle 122 can transmit a multimedia content response message to the first vehicle 120. The multimedia content response message can include contact information of the second vehicle 122. The first vehicle 120 and the second vehicle 122 can further communicate with each other by using each other's contact information and determine how to transmit the multimedia content. In some cases, the multimedia content request message, the multimedia content response message, or a combination thereof can include security credentials, e.g., public keys or certificates, that are used to establish a secure communication channel for the transmission of the multimedia content. The multimedia content response message can comprise a V2V message.

If the current location does not match the target location, the process 200 proceeds from 220 to 240, where the second vehicle 122 determines whether to forward the multimedia content request message. In some cases, the second vehicle 122 can determine whether to forward the multimedia content request message based on the relative locations of the first vehicle 120, the second vehicle 122, and the target location. For example, if the second vehicle 122 determines that, comparing to the location of the first vehicle 120 as indicated by the current location field in the multimedia content request message, the current location of the second vehicle 122 is closer to the target location, the second vehicle 122 can determine to forward the multimedia content request message. Alternatively or in combination, the second vehicle 122 can determine whether the second vehicle 122 is on a route between the current location of the first vehicle 120 and determine whether to forward the multimedia content request message accordingly.

If the second vehicle 122 determines to forward the multimedia content request message, the process 200 proceeds from 240 to 245, where the second vehicle 122 forwards the multimedia content request message to the third vehicle 124. Upon receiving the multimedia content request message, the third vehicle can perform step 220, just as the second vehicle 122 has performed. The third vehicle 124 can proceed to determine whether to generate and transmit multimedia content, or whether to continue to forward the multimedia content request message to a different vehicle. In some cases, the third vehicle 124 can transmit a multimedia content response message to the second vehicle 122, which would forward to the first vehicle 120. While the illustrated examples include three vehicles, more than three vehicles can participate in the request of multimedia content. For example, the multimedia content request message can be forwarded from one vehicle to another, until it is received by a vehicle at a location that matches the target location.

If the second vehicle 122 determines not to forward the multimedia content request message, the process 200 proceeds from 240 to 242, where the second vehicle 122 refrains from forwarding the multimedia content request message. In some cases, the second vehicle 122 can delete the multimedia content request message.

In some cases, the second vehicle 122 can determine whether or not to generate and transmit multimedia content further based on user inputs. For example, if the second vehicle 122 determines that the current location matches the target location, the second vehicle 122 can output a user input request on the user interface of the second vehicle 122. The user input request can include any one or more of a graphic, text, or audio prompt. The second vehicle 122 can also output other information of the multimedia content request, e.g., the current location and the contact information of the first vehicle 120, the target location, or a combination thereof, on the user interface. In response, the second vehicle 122 can receive user input through its user interface, indicating whether the generating and transmitting of the multimedia content is authorized. The second vehicle 122 can proceed to step 230 if the user input indicates that the generating and transmitting of the multimedia content is authorized. Similarly, the second vehicle 122 can determine whether to further forward the multimedia content request message based on user input. Alternatively or in combination, whether to generate and transmit the multimedia content, or whether to forward the multimedia content request message can be configured at the second vehicle 122, e.g., by an owner of the second vehicle 122, the manufacturer of the second vehicle 122, a server, or any combinations thereof.

In some cases, the multimedia content request message can indicate an end time. If the end time has reached, a vehicle that receives the multimedia content request message can discard the multimedia content request message without generating multimedia content or forwarding the multimedia content request message.

As discussed previously, the multimedia content request message and the multimedia content response message can comprise V2V messages. Alternatively or in combination, these messages can be conducted using V2I communication protocols. For example, the first vehicle 120 can transmit the multimedia content request message to a V2I server, and the V2I server can forward the multimedia content request message in a V2I message to the second vehicle 122.

FIG. 3 is a flow diagram showing an example method 300 that provides inter-vehicle data communications for multimedia content, according to an implementation. The method 300 can be implemented by the entities shown in FIG. 1, including, for example, the second vehicle 122. The method 300 shown in FIG. 3 can also be implemented using additional, fewer, or different entities. Furthermore, the method 300 shown in FIG. 3 can be implemented using additional, fewer, or different operations, which can be performed in the order shown or in a different order. In some instances, an operation or a group of operations can be iterated or repeated, for example, for a specified number of iterations or until a terminating condition is reached.

At 302, a first vehicle receives a multimedia content request message from a second vehicle. The multimedia content request message indicates a target location at which multimedia content is requested. At 304, a current location of the first vehicle is determined. At 306, in response to determining that the current location matching the target location, the multimedia content is generated. At 308, the first vehicle transmits the multimedia content. At 310, the first vehicle receives a second multimedia content request message. The second multimedia content request message indicates a second target location at which second multimedia content is requested. At 312, a second current location of the first vehicle is determined. At 314, in response to determining that the second current location does not match the second target location, the second multimedia content request message is forwarded to a fourth vehicle.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random-access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
   receiving, at a first vehicle, a multimedia content request message from a second vehicle, wherein the multimedia content request message indicates a target location at which multimedia content is requested, wherein the target location is different than a current location of the second vehicle;
   determining a current location of the first vehicle;
   in response to determining that the current location matches the target location, generating the multimedia content of the target location;
   transmitting, by the first vehicle, the multimedia content
   receiving, at the first vehicle, a second multimedia content request message, wherein the second multimedia content request message indicates a second target location at which second multimedia content is requested;
   determining a second current location of the first vehicle, wherein the second current location is different than the current location; and
   in response to determining that the second current location does not match the second target location, determining, by the first vehicle, whether to forward the second multimedia content request message to a third vehicle.

2. The method of claim 1, wherein the multimedia content comprises at least one of a picture or a video.

3. The method of claim 1, wherein the multimedia content request message comprises contact information of a fourth vehicle that requests the multimedia content, and the multimedia content is transmitted to the fourth vehicle using the contact information of the fourth vehicle.

4. The method of claim 3, wherein the multimedia content request message is transmitted using a vehicle-to-vehicle (V2V) message, and the multimedia content is transmitted using a Multimedia Messaging Service (MMS) message.

5. The method of claim 1, wherein the multimedia content request message indicates a third location of a fourth vehicle that requests the multimedia content, and the method further comprises:
   determining that the second target location is closer to the second current location than the third location, and wherein the second multimedia content request message is forwarded in response to the determining that the second target location is closer to the second current location than the third location.

6. The method of claim 1, further comprising: transmitting, by the first vehicle, a multimedia content response message, wherein the multimedia content response message comprises contact information of the second vehicle.

7. A first vehicle, comprising:
   at least one hardware processor; and
   at least one non-transitory computer-readable storage medium coupled to the at least one hardware processor and storing programming instructions for execution by the at least one hardware processor, wherein the programming instructions, when executed, cause the at least one hardware processor to perform operations comprising:

receiving, at the first vehicle, a multimedia content request message from a second vehicle, wherein the multimedia content request message indicates a target location at which multimedia content is requested, wherein the target location is different than a current location of the second vehicle;

determining a current location of the first vehicle;

in response to determining that the current location matches the target location, generating the multimedia content of the target location;

transmitting, by the first vehicle, the multimedia content;

receiving, at the first vehicle, a second multimedia content request message, wherein the second multimedia content request message indicates a second target location at which second multimedia content is requested;

determining a second current location of the first vehicle, wherein the second current location is different than the current location; and in response to determining that the second current location does not match the second target location, determining, by the first vehicle, whether to forward the second multimedia content request message to a third vehicle.

8. The first vehicle of claim 7, wherein the multimedia content comprises at least one of a picture or a video.

9. The first vehicle of claim 7, wherein the multimedia content request message comprises contact information of a fourth vehicle that requests the multimedia content, and the multimedia content is transmitted to the fourth vehicle using the contact information of the fourth vehicle.

10. The first vehicle of claim 9, wherein the multimedia content request message is transmitting using a vehicle-to-vehicle (V2V) message, and the multimedia content is transmitted using a Multimedia Messaging Service (MMS) message.

11. The first vehicle of claim 7, wherein the multimedia content request message indicates a third location of a fourth vehicle that requests the multimedia content, and the operations further comprise:

determining that the second target location is closer to the second current location than the third location, and wherein the second multimedia content request message is forwarded in response to the determining that the second target location is closer to the second current location than the third location.

12. The first vehicle of claim 7, the operations further comprising: transmitting, by the first vehicle, a multimedia content response message, wherein the multimedia content response message comprises contact information of the second vehicle.

13. At least one non-transitory computer-readable medium storing instructions which, when executed, cause a computing device to perform operations comprising:

receiving, at a first vehicle, a multimedia content request message from a second vehicle, wherein the multimedia content request message indicates a target location at which multimedia content is requested, wherein the target location is different than a current location of the second vehicle;

determining, by a hardware processor of the first vehicle, a current location of the first vehicle;

in response to determining that the current location matches the target location, generating the multimedia content of the target location;

transmitting, by the first vehicle, the multimedia content;

receiving, at the first vehicle, a second multimedia content request message, wherein the second multimedia content request message indicates a second target location at which second multimedia content is requested;

determining a second current location of the first vehicle, wherein the second current location is different than the current location; and in response to determining that the second current location does not match the second target location, determining whether to forward the second multimedia content request message to a third vehicle.

14. The computer-readable medium of claim 13, wherein the multimedia content comprises at least one of a picture or a video.

15. The computer-readable medium of claim 13, wherein the multimedia content request message comprises contact information of a fourth vehicle that requests the multimedia content, and the multimedia content is transmitted to the fourth vehicle using the contact information of the fourth vehicle.

16. The computer-readable medium of claim 15, wherein the multimedia content request message is transmitting using a vehicle-to-vehicle (V2V) message, and the multimedia content is transmitted using a Multimedia Messaging Service (MMS) message.

17. The computer-readable medium of claim 13, wherein the multimedia content request message indicates a third location of a fourth vehicle that requests the multimedia content, and the operations further comprise:

determining that the second target location is closer to the second current location than the third location, and wherein the second multimedia content request message is forwarded in response to the determining that the second target location is closer to the second current location than the third location.

* * * * *

UNITED STATES PATENT AND TRADEMARK OFFICE
CERTIFICATE OF CORRECTION

PATENT NO. : 10,856,120 B2
APPLICATION NO. : 16/012276
DATED : December 1, 2020
INVENTOR(S) : Edward Snow Willis, Kristian Neil Spriggs and Sameh Ayoub

Page 1 of 1

It is certified that error appears in the above-identified patent and that said Letters Patent is hereby corrected as shown below:

In the Claims

In Column 14, Line 21, In Claim 1, delete "content" and insert -- content; --, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*